(12) United States Patent
Keller

(10) Patent No.: US 7,104,667 B2
(45) Date of Patent: Sep. 12, 2006

(54) LIGHTED BARBEQUE GRILL WITH PIVOTING LEGS

(76) Inventor: Erroll D. Keller, 1508 Maple La., Ellisville, MO (US) 63011

( * ) Notice: Subject to any disclaimer, the term of this patent is extended or adjusted under 35 U.S.C. 154(b) by 80 days.

(21) Appl. No.: 10/967,939

(22) Filed: Oct. 19, 2004

(65) Prior Publication Data

US 2005/0083678 A1 Apr. 21, 2005

Related U.S. Application Data

(60) Provisional application No. 60/512,542, filed on Oct. 20, 2003.

(51) Int. Cl.
*F21V 33/00* (2006.01)
*F21V 29/00* (2006.01)

(52) U.S. Cl. .................. 362/92; 362/234; 362/253

(58) Field of Classification Search ............... 362/92, 362/93, 94, 234, 253, 399, 373; 126/25 R, 126/39 BA, 41 R, 58, 213; 99/341
See application file for complete search history.

(56) References Cited

U.S. PATENT DOCUMENTS 5,676,045 A * 10/1997 Faraj ..................... 99/341
2005/0034716 A1* 2/2005 Harbin ................ 126/25 R

* cited by examiner

*Primary Examiner*—Y. My Quach-Lee
(74) *Attorney, Agent, or Firm*—Charles C. McCloskey

(57) ABSTRACT

The present invention provides the lighting, electrical components, wheels, legs, and structure to modify a barbeque grill for night use and movement. The present invention attaches lights through the lid of a grill. Wiring connects the lights to the electrical system of a vehicle or truck. Upon the body of grill, the present invention installs legs with wheels and safety devices. The legs fold during transport and otherwise unfold for pushing the grill. The body also has reflectors to identify the grill. A cook checks food under the lid illuminated by the lights, pushes the grill upon wheels, and relocates the grill when mounted upon a trailer hitch.

7 Claims, 2 Drawing Sheets

LIGHTED BARBEQUE GRILL WITH PIVOTING LEGS

CROSS REFERENCE TO RELATED APPLICATION

This non-provisional patent application claims priority from the provisional application having Ser. No. 60/512,542, and filed on Oct. 20, 2003.

BACKGROUND OF THE INVENTION

The present invention relates to portable barbeque grills in general and more specifically to a light installed upon a grill and pivoting legs.

As the weather warms, people desire more outdoor cooking with grills. Spring, summer, and fall provide many opportunities to grill for family and friends. For some slow cooking entrees and at the beginning and ending of grill season, cooks run their grills during darkness. Other cooks make their entrees at sporting events or picnics where a grill moves from time to time.

A unique aspect of the present invention is illumination of the cooking food at night under a lid of a grill and support of the grill while moving. Illuminating the food allows a cook to check an entree without opening the lid. Prior art designs illuminated the food but with the lid up, releasing heat from the grill. Supporting the grill permits a single cook to grasp the grill in his hands and push the grill to a desired location. Prior art designs included arms to connect a grill to a vehicle but omitted legs to assist a cook in moving a grill. In summary, prior art requires a cook to open a lid to check food and to seek assistance when moving a grill.

DESCRIPTION OF THE PRIOR ART

The present art overcomes the limitations of the prior art. That is, the art of the present invention allows inspection of cooking food without opening a lid and movement of a grill by a single person.

The difficulty in providing illumination of the cooking food at night under a lid of a grill and support of the grill while moving is shown by the operation of typical devices. U.S. Pat. No. 5,257,169 to Walendziak shows a barbecue lid with a lighting apparatus joined to the handle of the lid. For the light to illuminate food, '169 requires a cook to open the lid. Next, U.S. Pat. No. 5,664,875 to Hegedus shows a gooseneck light clipped to an adjoining barbecue table. A cook must open the lid to illuminate food. Then, U.S. Pat. No. 6,132,055 to Grisamore et al. shows a light contained within the handle for a barbecue lid. Opening the lid fully permits shining the light upon food. But, U.S. Pat. No. 6,073,623 to Maschoff shows a barbecue grill with a retractable light mounted upon the grill housing, not the lid. Yet, the light requires an open lid to illuminate food. Next, U.S. Pat. No. 5,640,949 to Smith describes a portable barbecue grill. This grill has a support arm with a vertical portion and the grill bolted to the vertical portion. And, U.S. Pat. No. 5,626,126 to McNulty shows a transportable barbecue. This barbecue attaches to an articulated support arm that raises and lowers the barbecue. Illuminating through the lid and positioning pivot legs, the present invention overcomes the difficulties of food illumination without opening a lid and moving the grill by one person.

The present invention illuminates food upon a grill without opening the lid and moves upon retractable legs.

SUMMARY OF THE INVENTION

Generally, the present invention provides the lighting, electrical components, wheels, and legs to modify a barbeque grill for night use and movement. A grill has a body with a lid upon the body and the grill mounts to a trailer hitch. The present invention attaches a light through both sides of the lid. Wiring connects the lights to the electrical system of a vehicle or truck. The wiring plugs into a trailer wiring harness or a cigarette lighter to power the lights. Upon the body, the present invention installs three legs with wheels and safety devices. The three legs fold up to the grill body during transport by a truck. When away from a truck, the three legs unfold and place wheels upon the ground and a cook pushes the grill as needed. The body also includes tape or reflectors to identify the grill to other vehicles in traffic. A cook checks food under the lid illuminated by the lights, moves the grill upon wheels, and relocates the grill mounted upon a trailer hitch. The present invention makes the tasks of the cook easier and more enjoyable.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved lighted barbeque with pivoting legs.

Another object is to provide such a lighted barbeque that installs readily upon existing grill bodies.

Another object is to provide such a lighted barbeque that illuminates food without opening the lid of a grill.

Another object is to provide such a lighted barbeque marked with reflectors or other devices for heightened safety in automotive traffic.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The same reference numerals refer to the same parts throughout the various figures.

DESCRIPTION OF THE PREFERRED EMBODIMENT

Figure 1:
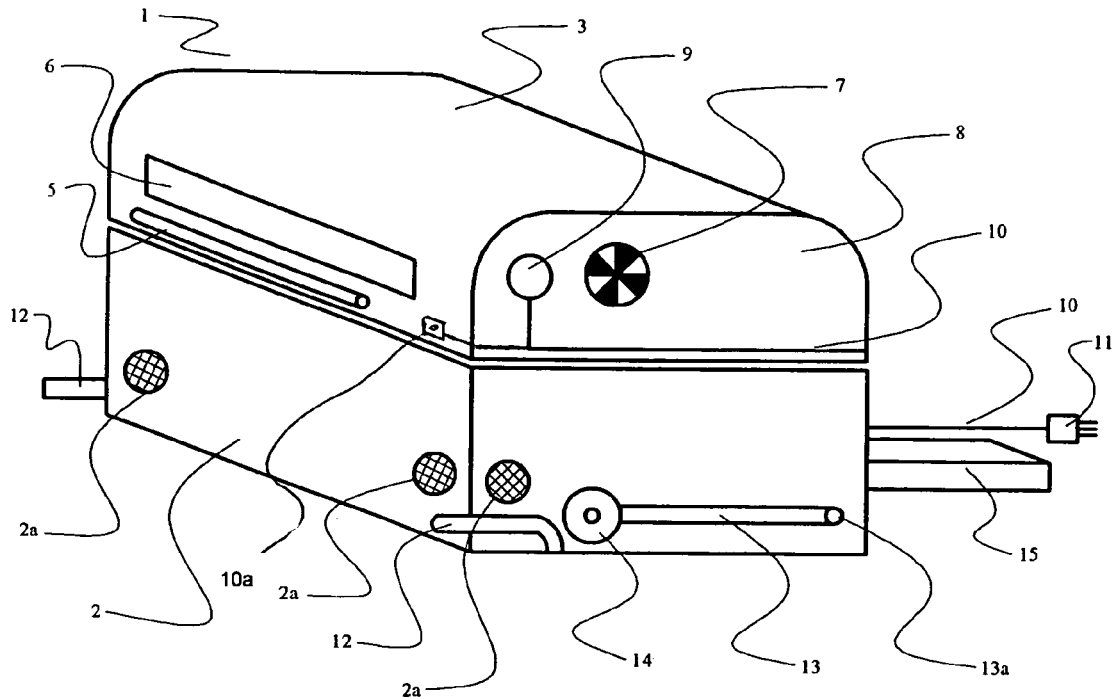
FIG. 1 shows a perspective view of the preferred embodiment of the lighted barbeque grill with pivoting legs constructed in accordance with the principles of the present invention.

The present art overcomes the prior art limitations by lights upon the interior of a lid to a grill and folding legs with wheels to support a grill in motion, used by cooks when grilling at night. Beginning with FIG. 1, a barbeque grill 1 has a generally rectangular body 2 with a lid 3 atop the body 2. The lid 3 has one or more hinges 4 connecting the lid 3 to the body 2. Opposite the hinges 4, the lid 3 has a handle 5 for a cook to open the lid 3. Above the lid 3 handle 5, the lid 3 has a window 6 of heat resistant glass, parallel to the length of the grill 1. Adjustable vents 7 release smoke generated by cooking from one or both ends 8 of the lid 3. The lighted barbeque grill 1 has one or more lights 9 upon each end 8 of the lid 3. The lights 9 penetrate through the lid 3 and illuminate the interior of the lid 3 and the body 2. A wiring harness 10 connects the lights 9 together with a switch 10a and terminates in a plug 11. The plug 11 connects with a vehicle power supply similar to a trailer lighting connection and cigarette lighter connection.

The body 2 has two opposite handles 12, generally J shaped. The handles 12 attach to the body 2 at each end 8 and away from the lid 3, on the short leg of the J shape. Opposite each handle 12 and beneath the window 6, a pivoting leg 13 joins the body 2. The pivoting leg 13 rotates about a pin 13a extending from the body 2. The legs 13 extend from pins 13a and terminate with a wheel 14. The legs 13 have sufficient length to assist a cook in moving the grill 1 while holding the handles 12. Extending from the center of the bottom of the body 2, a support arm 15 connects with a square cross section hitch upon a vehicle. Generally located upon the body 2, means 2a identify the body 2 to other vehicles. The identifying means 2a take the form of reflectors, reflective tape, safety lights, and the like, positioned upon corners and opposite the support arm 15.

Figure 2:
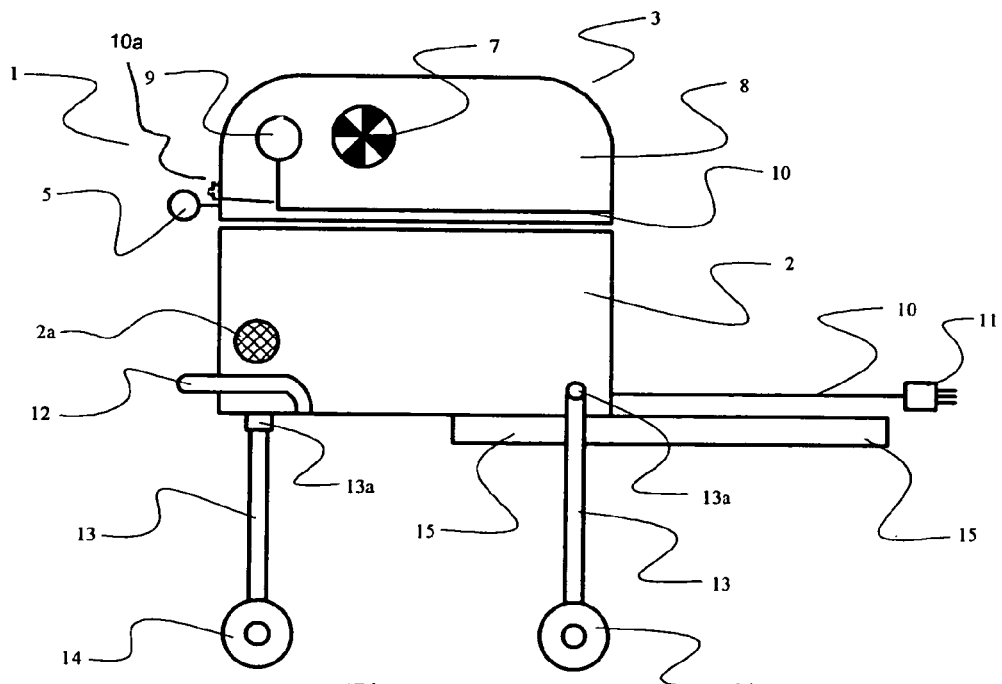
FIG. 2 shows an end view of the lighted barbeque grill with pivoting legs deployed; and, FIG. 3 shows a top view of the stabilizer of the lighted barbeque grill with pivoting legs.

Moving to FIG. 2, a pivot leg 13 rotates about the pin 13a and assumes a vertical orientation, perpendicular to the support arm 15. Another pivot leg 13 unfolds from the body 2 between the handles 12. The three pivot legs 13, when unfolded, allow the grill 1 to stand. In this orientation, the pivot legs 13 support the weight of the grill 1 while a cook holds the handles 12 while moving the grill 1 or installing the grill 1 into the hitch of a vehicle. Akin to FIG. 1, the lid 3 has a light 9 installed on the end 8 of the lid 3. The light 9 penetrates within the lid 3 to illuminate food while cooking. A section of wiring harness 10 extends from the light 9, controlled by a switch, and terminates in a plug 11. Again, the plug 11 connects to the vehicle power supply, like a trailer does, or to a cigarette lighter. As in FIG. 1, FIG. 2 also shows identifying means 2a, here located proximate to the handle 12. At this location, the means 2a identify the body 2 to another vehicle turning behind a vehicle transporting the invention 1.

Figure 3:
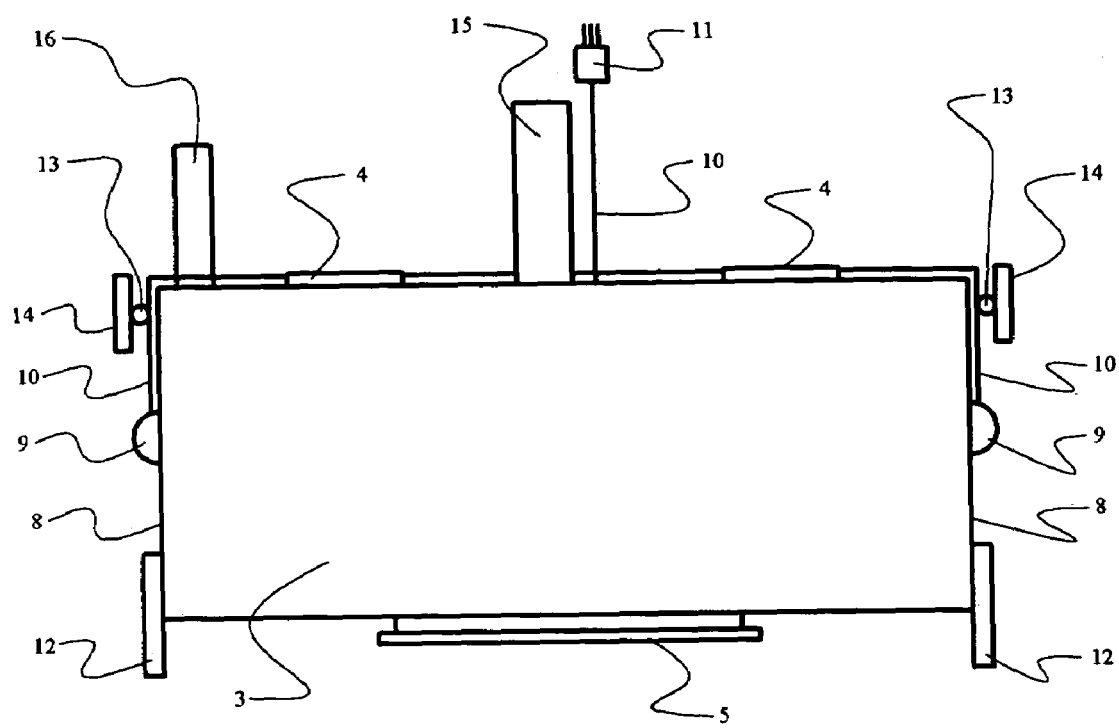

Turning to FIG. 3, the grill 1 has a stabilizer 16 extending collinear with the support arm 15 on one end 8 of the grill 1, generally the driver's side. The stabilizer 16 connects to the vehicle (not shown), thus stiffening the connection of the grill 1 to the hitch. With the support arm 15 and stabilizer 16 secured to the vehicle, a driver can move a vehicle with the grill 1 attached. The body 2 has two opposite handles 12 on the end 8 for assisting in movement of the grill 1. Opposite the handles 12, legs 13 ending in wheels 14 pivot upon pins 13a fixed to the body 2. Atop the body 2, the lid 3 has one or more lights 9 located in the ends 8 to illuminate the interior of the grill 1. The lights 9 receive power from a switch controlled wiring harness 10 that terminates in a plug 11 for connection to the vehicle power supply. The lid 3 also has an adjustable vent 7 with one or more holes and one or more tabs. The tabs permit the cook to adjust the proportion of hole opening and regulate release of smoke.

Typically, the lighted barbeque grill 1 with pivoting legs 13 operates in many environments such as a garage, a park, a parking lot, trackside, a picnic area, and the like. To utilize the present art, a cook releases the pivot legs 13 and grasps the handles 12. Lifting the handles 12, the cook raises the grill 1 body 2 from the ground to waist height. The pivot legs 13 rotate to the vertical position and lock upright. The cook then moves the grill 1 towards a vehicle. At a vehicle, the cook inserts the support arm 15 into a square end hitch. The cook secures the support arm 15 and rotates the pivot legs 13 to a horizontal position up to the grill 1 body 2. Next, the cook secures the plug 11 of the wiring harness 10 to the vehicle electrical connection commonly provided for trailers or to the cigarette lighter. With the wiring harness 10 energized, the lights 9 illuminate within the lid 3. The cook then starts a fire within the body 2. Once the fire is right, the cook places food within the body 2 for cooking. The cook closes the lid 3 upon the food and observes the food through the window 6 as illuminated by the lights 9.

The preferred embodiment uses a grill body and lid, typically made of aluminum and readily available in the consumer market. The lights and wiring harness are of a heat resistant material. The pivot legs are tubular steel. In an alternate embodiment, the pivot legs have telescoping sections for a cook to adjust the height of the grill.

From the aforementioned description, a lighted barbeque grill with pivoting legs has been described. The lighted barbeque grill with pivoting legs is uniquely capable of illuminating food cooking under a lid. The lighted barbeque grill with pivoting legs and its various components may be manufactured from many materials including, but not limited to, plastics, polymers, high density polyethylene HDPE, polyvinyl chloride PVC, nylon, ferrous and non-ferrous metals and their alloys, glass, plastics, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An illuminated grill has a generally rectangular body, a lid upon the body has two opposite ends and sides joining both ends, a window within a side of the lid, a lid handle generally beneath the window, and one or more vents, wherein the improvement comprises:

one or more lights installed through the lid;
   a wiring harness connecting said lights to an electrical power source;
   a support arm centered and attached beneath said body;
   a stabilizer attached beneath said body towards one end;
   three or more legs pivoting from said body downwards having wheels upon said legs opposite said body;
   one or more handles mutually spaced apart upon said body; and, means to identify the grill located upon said body;

whereby said lights illuminate the interior of the grill without opening said lid;

whereby said legs allow the grill to stand at a height comfortable to a cook and a cook moves the grill using the handles; and, whereby drivers of other vehicles can see the grill.

2. The illuminated grill of claim 1 wherein said lights withstand cooking temperatures.

3. The illuminated grill of claim 1 wherein said wiring harness connects to a vehicle trailer socket, a vehicle cigarette lighter socket, a generator, or utility service.

4. The illuminated grill of claim 3 further comprising:

one or more switches to control said lights, said switches located proximate to the lid handle.

5. The illuminated grill of claim 1 further comprising:

said support arm having a generally rectangular cross section receivable by a hitch mounted upon a vehicle, and said support arm separating the grill from the vehicle so that the lid may open without contacting the vehicle;

said stabilizer extending from a corner of said body spaced apart and parallel to said support arm, and said stabilizer connecting to the vehicle to prevent the grill from rotating;

each of said handles attached to said body proximate to the corners and opposite said support arm; and, each of said legs pivoting upon a hinge attached to the body.

6. The illuminated grill of claim 1 wherein the identifying means is one of reflectors, reflective tape, or safety lights.

7. The illuminated grill of claim 1 wherein said lights are installed through the ends of the lid.

* * * * *